United States Patent
Rouhiainen et al.

(10) Patent No.: US 9,519,492 B2
(45) Date of Patent: Dec. 13, 2016

(54) SYSTEMS AND METHODS FOR ACCESSING INTERFACE PROPERTIES OF DATA OBJECTS

(75) Inventors: Hannu Rouhiainen, Katy, TX (US); Bernd Ruehlicke, Houston, TX (US); Oddvar Gjerde, Hafrsfjord (NO)

(73) Assignee: Landmark Graphics Corporation, Houston, TX (US)

(*) Notice: Subject to any disclaimer, the term of this patent is extended or adjusted under 35 U.S.C. 154(b) by 1377 days.

(21) Appl. No.: 12/205,569

(22) Filed: Sep. 5, 2008

(65) Prior Publication Data
US 2009/0070287 A1 Mar. 12, 2009

Related U.S. Application Data

(60) Provisional application No. 60/970,433, filed on Sep. 6, 2007.

(51) Int. Cl.
G06F 17/30 (2006.01)
G06F 9/44 (2006.01)
G01V 99/00 (2009.01)

(52) U.S. Cl.
CPC ....... G06F 9/4428 (2013.01); G06F 17/30569 (2013.01); G01V 99/00 (2013.01)

(58) Field of Classification Search
CPC ............... G06F 17/30569; G06F 17/30864; G06F 17/30; G06F 17/30017; G06F 17/30289; G06F 17/30424
USPC ...................... 702/11, 14; 707/754
See application file for complete search history.

(56) References Cited

U.S. PATENT DOCUMENTS

2004/0204859 A1 10/2004 Knobloch
2005/0213809 A1 9/2005 Lees et al.

FOREIGN PATENT DOCUMENTS

WO       9928767 A      6/1999
WO    WO 9928767    *  6/1999  ............ G01V 11/00

OTHER PUBLICATIONS

Andrienko, Gennady L., and Natalia V. Andrienko. "Interactive maps for visual data exploration." International Journal of Geographical Information Science 13.4 (1999): 355-374.*
Fonseca, Frederico T., and Max J. Egenhofer. "Ontology-driven geographic information systems." Proceedings of the 7th ACM international symposium on Advances in geographic information systems. ACM, 1999.*
Guillen, Antonio, et al. "Geological modelling from field data and geological knowledge: part II. Modelling validation using gravity and magnetic data inversion." Physics of the Earth and Planetary Interiors 171.1 (2008): 158-169.*
The International Search Report and the Written Opinion of the International Searching Authority; Dec. 9, 2008; 16 pgs.; Patent Cooperation Treaty; European Patent Office; Munich, Germany.
Joint UK Project Developing Basin Geology Modelling Tool; Offshore/Oilman; Apr. 1993; pp. 86-87; vol. 53, No. 4; Tulsa, OK.

(Continued)

*Primary Examiner* — Nan Hutton
(74) *Attorney, Agent, or Firm* — Crain, Caton & James; Alan Bryson

(57) ABSTRACT

Systems and methods for accessing functional interface properties for data objects through a value map. The value map may or may not be visible at the client interface.

14 Claims, 4 Drawing Sheets

(56) References Cited

OTHER PUBLICATIONS

Ferrier, G. & Wadge, G,; An Integrated GIS and Knowledge-Based System as an Aid for the Geological Analysis of Sedimentary Basins; International Journal of Geographical Information Science; Apr. 1997; pp. 281-297; vol. 11, No. 3; London, G.B.
Cannon, Robert L., Moore, Philip, Tansathein. Dusit, Strobel, John, Kendall, Christopher, Biswas, Gautam & Bezdek, James; An Expert System as a Component of an Integrated System for Oil Exploration; IEEE Proceedings—1989 Southeastcon; Apr. 9, 1989; pp. 32-35.
Perveen, Rehana; International Preliminary Report on Patentability (PCT/US08/75479); Apr. 15, 2011; 5 pgs.; Commissioner of Patents; Alexandria, VA.
Whittington, J.; Examination Report; dated Nove er 26, 2014; 5 pages; Patent Application No. 08799259.0/1808; EPO; Munich, Germany.
Russell, Alistair; Response to Examination Report; dated Mar. 26, 2015; 19 pages; Patent Application No. 08799259.0-1808; Hofffmann-Eitle; Munich, Germany.
Cannon Robertt et al.; An Expert Sytem As a Component of An Integrated System for Oil Exploration; IEEE Session 1082; dated Apr. 9, 1989;3 pages; IEEE.
Joint UK Project Developing Basin Geoiogy Modelling Tool; dated Apr. 1, 1993; 2 pages; Offshore/Oilman; Tulsa, OK.
Ferrier, G and Wadge G.; An Integrated GIS and Knowledge-Based System As a Aid for the Geological Analysis of Sedimentary Basins; Int.; J. Geographical Information Science; dated Apr. 1, 1997; pp. 281-297; vol. 11, No. 3, Taylor and Frana's Ltd.; UK.

\* cited by examiner

SYSTEMS AND METHODS FOR ACCESSING INTERFACE PROPERTIES OF DATA OBJECTS

CROSS-REFERENCE TO RELATED APPLICATIONS

The priority of U.S. Provisional Patent Application No. 60/970,433, filed on Sep. 6, 2007, is hereby claimed, and the specification thereof is incorporated herein by reference.

STATEMENT REGARDING FEDERALLY SPONSORED RESEARCH

Not applicable.

FIELD OF THE INVENTION

The present invention generally relates to data objects and in particular efficiently accessing functional interface properties for data objects through a value map.

BACKGROUND OF THE INVENTION

Data access in oil exploration and production is modeled with data objects. These data objects are complex, containing a large number of different properties. Data objects containing twenty (20) to fifty (50) properties are not uncommon. These data objects need to implement functional interfaces, which expose the data object as an interface property. An interface property enables the data object to implement interfaces in an extensible way.

Each data object may expose more than one functional interface property. As a result, various problems exist with implementation. Implementing every interface property through the data object, for example, makes the actual data object excessively complex. There may also be two interface properties that have identical signatures with the same name and argument, which may be indistinguishable in preferred programming languages such as, for example, Java™. Finally, having a data object with many interface properties makes it difficult for client applications to find and use the interface properties.

In FIG. 1, a block diagram 100 illustrates a conventional implementation for directly accessing the interface properties of a data object. The interface properties 102 are implemented through the data object 104. This data object includes all interface properties, which may be indistinguishable in preferred programming languages. Thus, it is difficult for client applications to find and use particular interface properties.

The value map 106 contains identifiers for all properties and values from the data object in an unorganized grouping. This conventional implementation is often subject to the shortcomings described thus far in that, for example, it is difficult or impossible for the client to identify and access the interface properties for practical use.

There is therefore, a need for systems and methods that overcome the foregoing deficiencies and provide a more efficient manner of accessing functional interfaces for data objects by the client and at the data tier.

SUMMARY OF THE INVENTION

The present invention meets the above needs and overcomes one or more deficiencies in the prior art by providing systems and methods for accessing interface properties of data objects through a value map.

In one embodiment, the present invention includes a method for accessing interface properties of a data object, which comprises i) getting the data object from a first data field outside a value map in a second data field, wherein the data object includes data values and related data; and ii) getting an interface property for the data object from a value map in the second data field using a computer processor.

In another embodiment, the present invention includes a non-transitory program carrier device tangibly carrying computer executable instructions for accessing interface properties of a data object, the instructions being executable to implement: i) getting a data object from a first data field outside a value map in a second data field, wherein the data object includes data values and related data; and ii) getting an interface property for the data object from a value map in the second data field.

In yet another embodiment, the present invention includes a non-transitory program carrier device having a data structure stored thereon, the data structure comprising: i) a first data field, the first data field comprising a data object, wherein the data object includes data values and related data; and ii) a second data field outside the first data field, the second data field comprising a value map with an interface property for the data object.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. OpenWorks® and SeisWorks®, which are commercial software applications marketed by Landmark Graphics Corporation, may be used as interface applications to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 1:
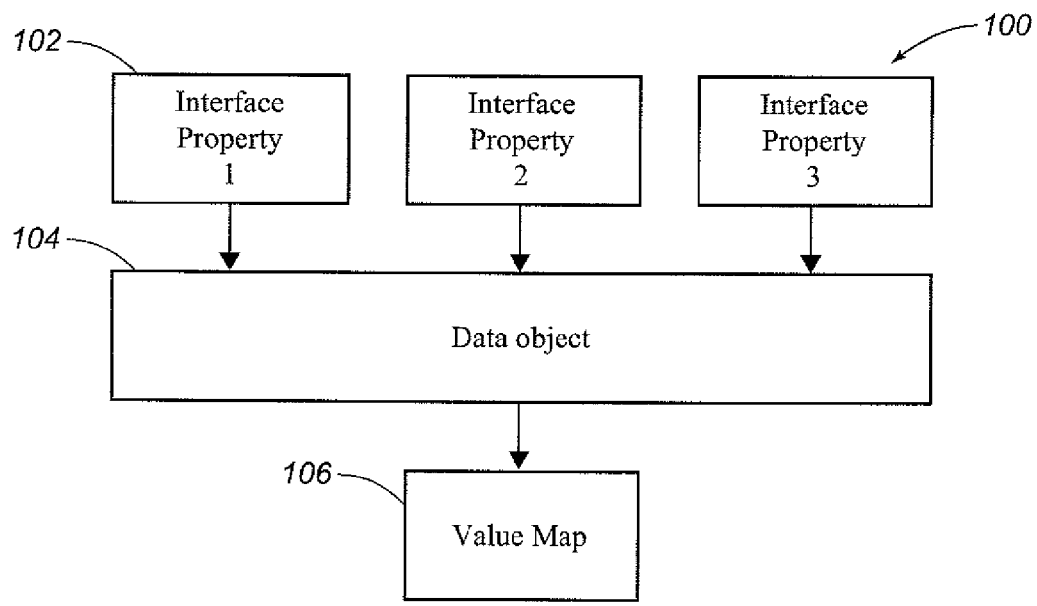
FIG. 1 is a block diagram illustrating a conventional implementation for accessing interface properties of a data object.
Figure 2:
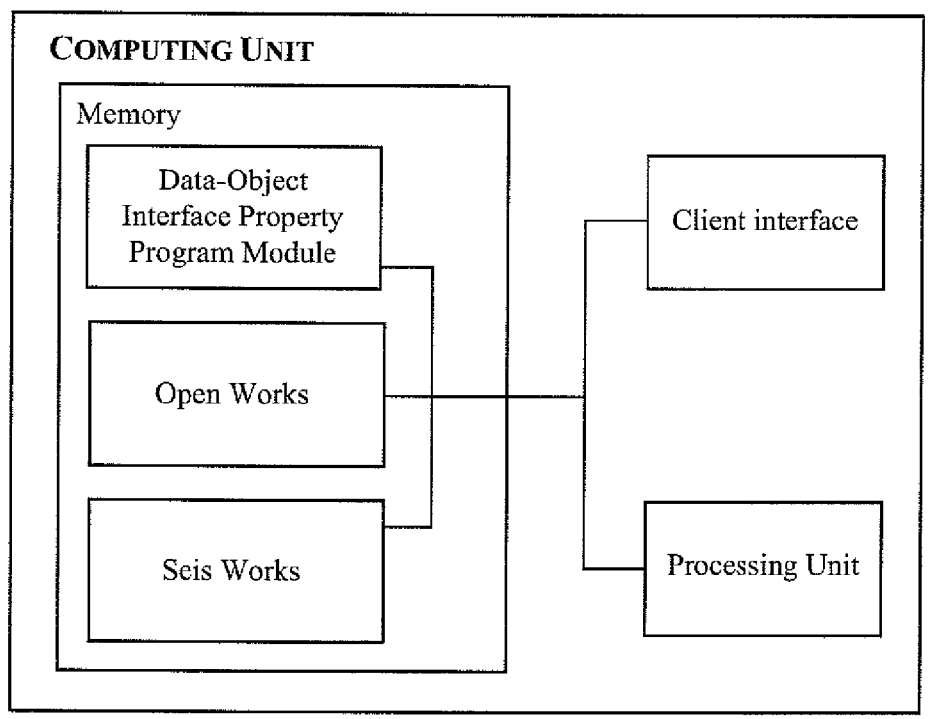
FIG. 2 is a block diagram illustrating a system for implementing the present invention on a computer.

Referring now to FIG. 2, a block diagram of a system for implementing the present invention on a computer is illustrated. The system includes a computing unit, sometimes referred to a computing system, which contains memory, application programs, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 3-6. The memory therefore, includes a Data object Interface Property Program Module, which enables the methods illustrated and described in reference to FIGS. 5-6, SeisWorks® and OpenWorks®.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above therefore, store and/or carry computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

Figure 3:
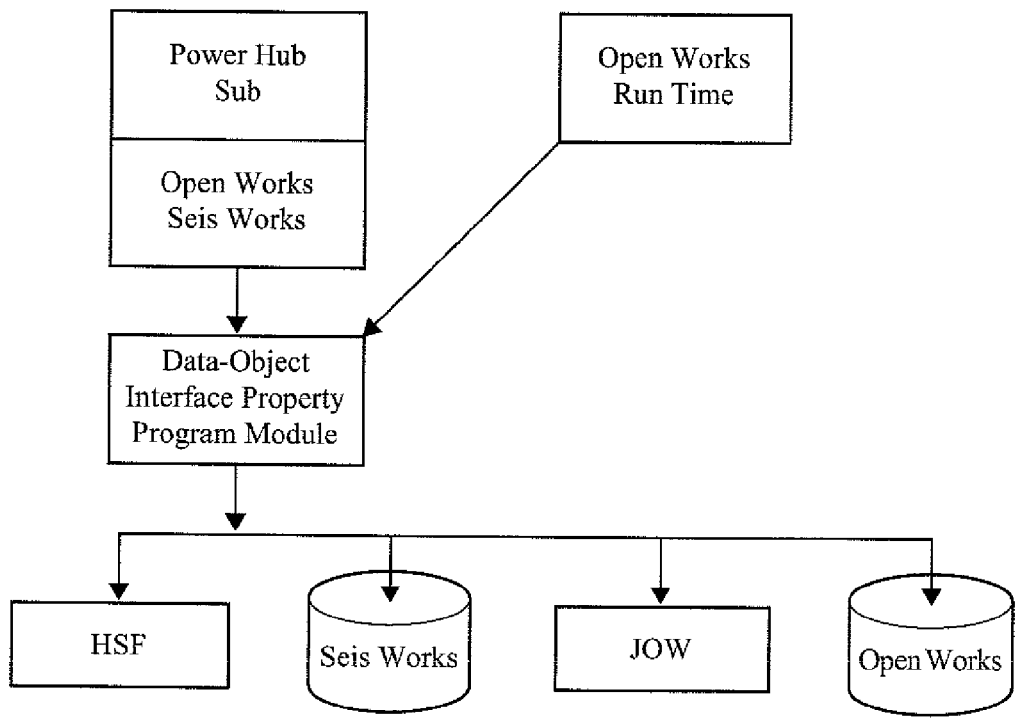
FIG. 3 is a block diagram illustrating an interface between the Data object Interface Property Program Module in FIG. 2 and other commercially available software applications.

Referring now to FIG. 3, a block diagram illustrates an interface between the Data object Interface Property Program Module in FIG. 2 and other commercially-available software applications, which are marketed by Landmark Graphics Corporation. PowerHub is a client application that uses the services and data accesses from the Data Object Interface Property Program Module. Each interface is used to access large and complex data like seismic data access and location/grid information. The Data object Interface Property Program Module may be written in any well-known object-oriented language, such as, for example, Java™, which also permits platform independence. The interface properties are implemented through the Data object Interface Property Program Module. They provide access to data and services to complex lower level data-access modules, like HSF, JOW, SeisWorks, and OpenWorks. The interface properties could also be used to provide additional services that are independent of the data-access modules.

Figure 4:
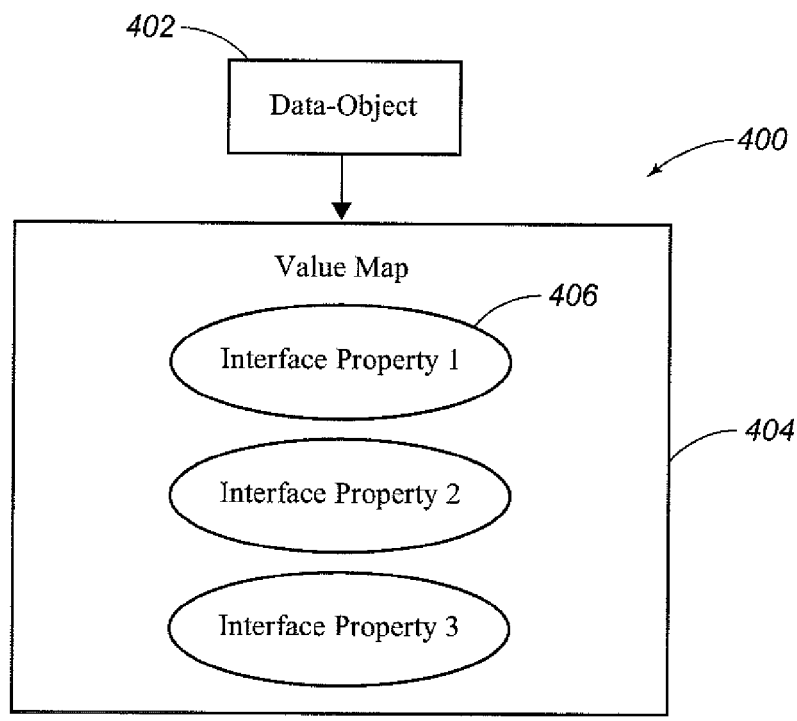
FIG. 4 is a block diagram illustrating a data structure for implementing the present invention on a computer.

Referring now to FIG. 4, block diagram 400 illustrates a data structure for implementing the present invention on a computer. The data object 402 forms the base of the entire structure. Each interface property 406 is included in the value map 404. This data structure permits the client to access the interface property directly through the value map without the necessity of accessing the data object. Placing the interface properties in the value map rather than interfacing with the data object from outside the value map enables more accessibility and/or flexibility for the client and at the data tier. The client can access both the interface properties as well as the conventional value map properties. This implementation is easier to develop and maintain.

Method Description

Figure 5:
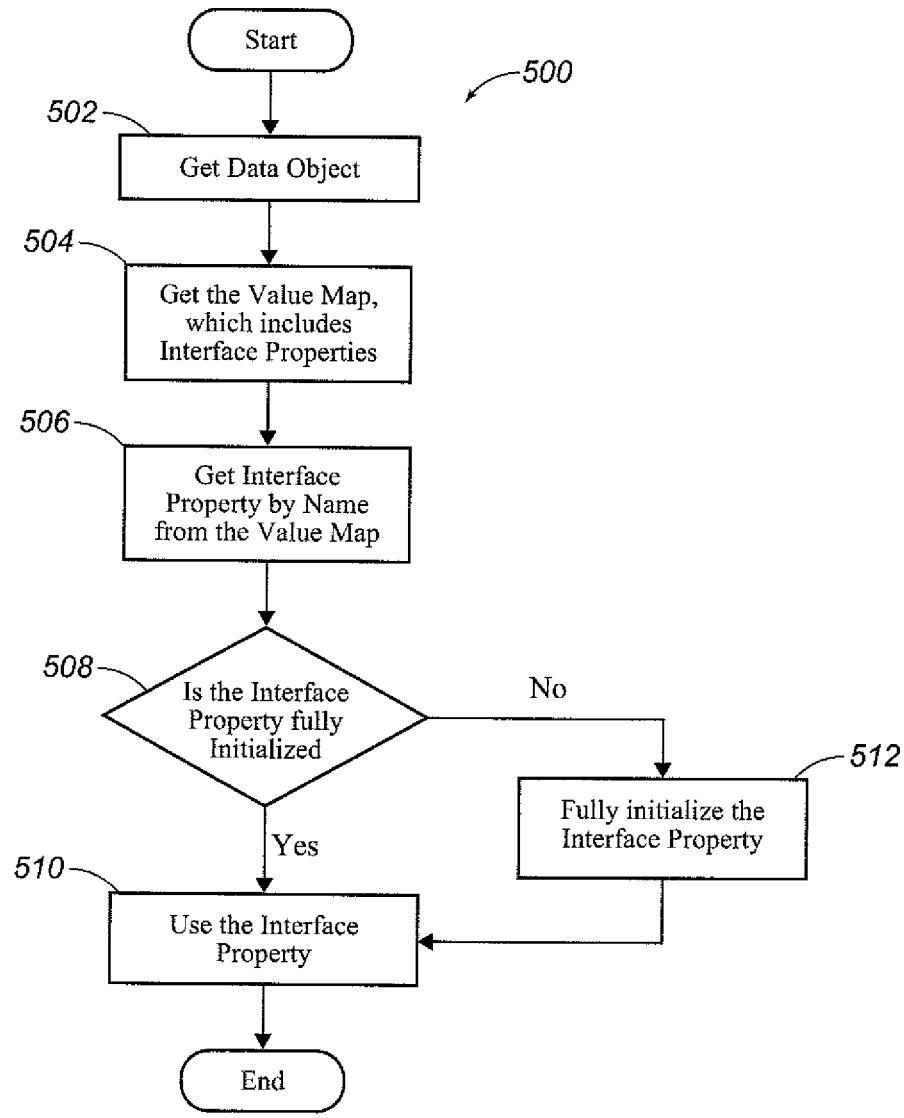
FIG. 5 is a flow chart illustrating a method for implementing the present invention.

Referring now to FIG. 5, a method 500 for implementing the present invention is illustrated. The method 500 starts by getting the data object in step 502 and then getting the value map in step 504. The interface property is retrieved from the value map 504 by name in step 506.

The method 500 then determines if the interface property is fully initialized in step 508. Each interface property may be fully initialized when 1) it is created; 2) it is used for the first time; or 3) after it is created and before it is used. Initialization also depends on the data object and uses techniques well known in the art. If the interface property is fully initialized, then the method 500 proceeds to use the interface property such as, for example, to call an interface method in step 510, like get( ) or set( ). An interface method could be any method used for the application. Otherwise, the interface property must be fully initialized at step 512 before proceeding to step 510. Step 512 may not be required if the use of the interface property does not call (get or set) the interface method(s) because there is no need to initialize.

As used herein, the data object may be a seismic-data set including, but not limited to, horizon data, a fault-plane trimesh or a seismic three-dimensional survey, which may be stored in the memory of a computer system.

Figure 6:
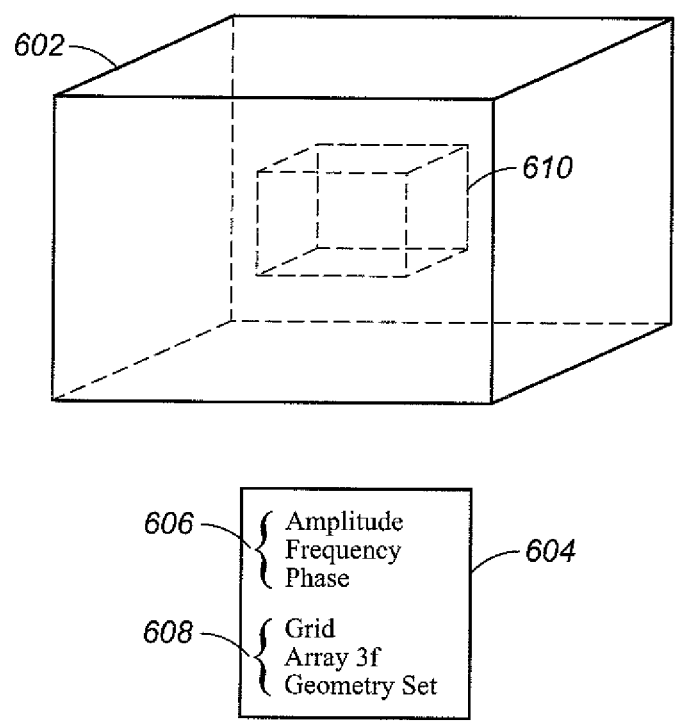
FIG. 6 illustrates one application of the present invention.

In FIG. 6, one application of the present invention is illustrated. A data object 602, such as a three-dimensional seismic-data set, includes related data 610. A value map 604 is associated with the data object 602. The value map 604 contains attribute properties 606, which may include, for example, amplitude, frequency, and phase. Each attribute property 606 is associated with a respective value. The value map 604 also contains interface properties 608. Each interface property 608 is associated with a respective instance, which may include, for example, grid, array 3f and geometry set. The interface properties 608 are distinct from the attribute properties 606 in that they are utilized to access different data. Once the data object 602 is selected and specific data is requested, the system gets the value map 604 and accesses data (values) through the attribute properties 606 or accesses the related data 610 by using each instance of the interface properties 608 to call each respective interface method, which provide access to the related data 610. An interface property therefore, is anything that can access data in a predetermined way. The value map 604 may or may not be visible at the client interface illustrated in FIG. 2. In this improved implementation, the functional interface properties 608 are no longer separate from the value map 604. The system therefore, does not retrieve data directly from the data object 602 but rather, retrieves the requested data through the value map 604.

The systems and methods of the present invention therefore, improve accessing interface properties of data objects by placing the interface properties in the value map.

Because the systems and methods described herein may be used to access interface properties for data objects, they may be particularly useful in fields such as, for example, medical and geophysical.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for accessing interface properties of a data object, comprising:
   getting the data object from a first data field outside a value map in a second data field, wherein the data object includes data values and related data; and
   getting an interface property for the data object from the value map in the second data field using a computer processor.

2. The method of claim 1, further comprising initializing the interface property.

3. The method of claim 1, further comprising getting an attribute property for the data object from the value map.

4. The method of claim 3, wherein the attribute property is associated with a data value and the interface property is associated with an instance.

5. The method of claim 3, further comprising using the attribute property to access the data values.

6. The method of claim 1, further comprising using the interface property to call an interface method and access the related data.

7. A non-transitory program carrier device tangibly carrying computer executable instructions for accessing interface properties of a data object, the instructions being executable to implement:
   getting a data object from a first data field outside a value map in a second data field, wherein the data object includes data values and related data; and
   getting an interface property for the data object from the value map in the second data field.

8. The program carrier device of claim 7, further comprising initializing the interface property.

9. The program carrier device of claim 7, further comprising getting an attribute property for the data object from the value map.

10. The program carrier device of claim 9, wherein the attribute property is associated with a data value and the interface property is associated with an instance.

11. The program carrier device of claim 9, further comprising using the attribute property to access the data values.

12. The program carrier device of claim 7, further comprising using the interface property to call an interface method and access the related data.

13. A non-transitory program carrier device having a data structure stored thereon, the data structure comprising:
   a first data field, the first data field comprising a data object, wherein the data object includes data values and related data; and
   a second data field outside the first data field, the second data field comprising a value map with an interface property for the data object.

14. The program carrier device of claim 13, wherein the value map includes an attribute property for the data object.

* * * * *